United States Patent
Chi (10) Patent No.: US 9,621,103 B2
(45) Date of Patent: Apr. 11, 2017

(54) CIRCULATING CURRENT AND OSCILLATING CURRENT SUPPRESSING METHOD AND PARALLEL INVERTER DRIVER SYSTEM

(71) Applicant: DELTA ELECTRONICS, INC., Taoyuan (TW)

(72) Inventor: Chien-Yu Chi, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

(21) Appl. No.: 14/970,196

(22) Filed: Dec. 15, 2015

(65) Prior Publication Data

US 2016/0373044 A1 Dec. 22, 2016

(30) Foreign Application Priority Data

Jun. 18, 2015 (TW) .............................. 104119669 A (51) Int. Cl.
 *H02P 6/14* (2016.01)
 *H02P 27/08* (2006.01)
 *H02M 7/5395* (2006.01)

(52) U.S. Cl.
 CPC .......... *H02P 27/08* (2013.01); *H02M 7/5395* (2013.01)

(58) Field of Classification Search
 CPC ...... H02M 7/493; H02M 1/12; H02M 7/5395; H02P 27/08; H02P 6/28; H02J 3/01
 See application file for complete search history.

(56) References Cited

U.S. PATENT DOCUMENTS

2016/0028301 A1* 1/2016 Murakami ................ H02J 3/01
 363/41

* cited by examiner

*Primary Examiner* — Karen Masih
(74) *Attorney, Agent, or Firm* — Kirton McConkie; Evan R. Witt (57) ABSTRACT

A circulating current and oscillating current suppressing method and parallel inverter driver system are disclosed. Each inverter driver outputs a suppressing three-phase current to a motor and has an entity inductance device and a virtual inductance device. The virtual inductance device receives and sums the suppressing three-phase current of the inverter drivers, and generates a compensated three-phase current according to the suppressing three-phase currents, an impedance of the motor and an ideal impedance value generated by a virtual inductance unit and the entity inductance device. Consequently, the oscillating current of the transition three-phase current outputted from a switch device of the inverter driver can be reduced. In addition, the circulating current suppressing device generates a corrected three-phase voltage command according to a zero-sequence current and/or the circulating current quantity of the parallel inverter driver system, thereby suppressing the zero-sequence current and the circulating current of the parallel inverter driver system.

10 Claims, 9 Drawing Sheets

Collecting a suppressing three-phase current of the output of each inverter driver and a summation current information which is generated after summing all the suppressing three-phase currents of the inverter drivers by using a voltage generation unit of a virtual inductance device, and calculating the collected current information by using an impedance to generate a corrected three-phase voltage in each inverter driver correspondingly. — S1

Comparing the corrected three-phase voltage of each inverter driver with a three-phase voltage command of each inverter driver by using a voltage comparator unit of the virtual inductance device to generate a compensated three-phase voltage. — S2

Converting the compensated three-phase voltage of each inverter driver to a compensated three-phase current by using a voltage/current calculation unit of the virtual inductance device, wherein the compensated three-phase current is corresponding to a current generated by simulating the transition three-phase current which co-suppressed by a virtual inductance unit and the entity inductance device. — S3

CIRCULATING CURRENT AND OSCILLATING CURRENT SUPPRESSING METHOD AND PARALLEL INVERTER DRIVER SYSTEM

FIELD OF THE INVENTION

This disclosure relates to a circulating current and oscillating current suppressing method, and more particularly to a circulating current and oscillating current suppressing method and parallel inverter driver system, which employs a virtual inductance device to generate virtual inductance units for co-suppressing current oscillation with an entity inductance device, thereby allowing the entity inductance device with lower cost and smaller volume to be used in the circuit or increasing the current suppressing effect of the entity inductance device.

BACKGROUND OF THE INVENTION

Generally, a motor needs an inverter driver to control the rotor frequency of the motor and regulate the rotation speed of the motor, so as to drive the motor to operate. In order to increase the safety of the motor during the operation period, a parallel inverter driver system has been proposed. The parallel inverter driver system includes a plurality of inverter drivers with their outputs connected in parallel with each other, thereby driving the motor. The parallel inverter driver system is different from the conventional inverter driver system in that the parallel inverter driver system is made by substituting the bulky inverter driver with a number of small-volume inverter drivers and allowing these small-volume inverter drivers to output collaboratively for driving motor. The main features of the parallel inverter driver system are focused on modularity and redundancy. The modularity feature means that the controllers for individual inverter drivers with small capacity are independent from other inverter drivers. Thus, the user can expand or lessen the capacity of the inverter driver system depending on user's demands. The redundancy feature means that in case of malfunction, the damaged inverter driver can be replaced during the operation of the inverter driver system without overhauling the entire system. If the inverter driver system is appropriately designed, the motor can be driven to operate continuously on the condition that the other undamaged inverter drivers are operating normally, while the damaged inverter drivers are replaced without the need of shutting down the entire system.

Figure 1:
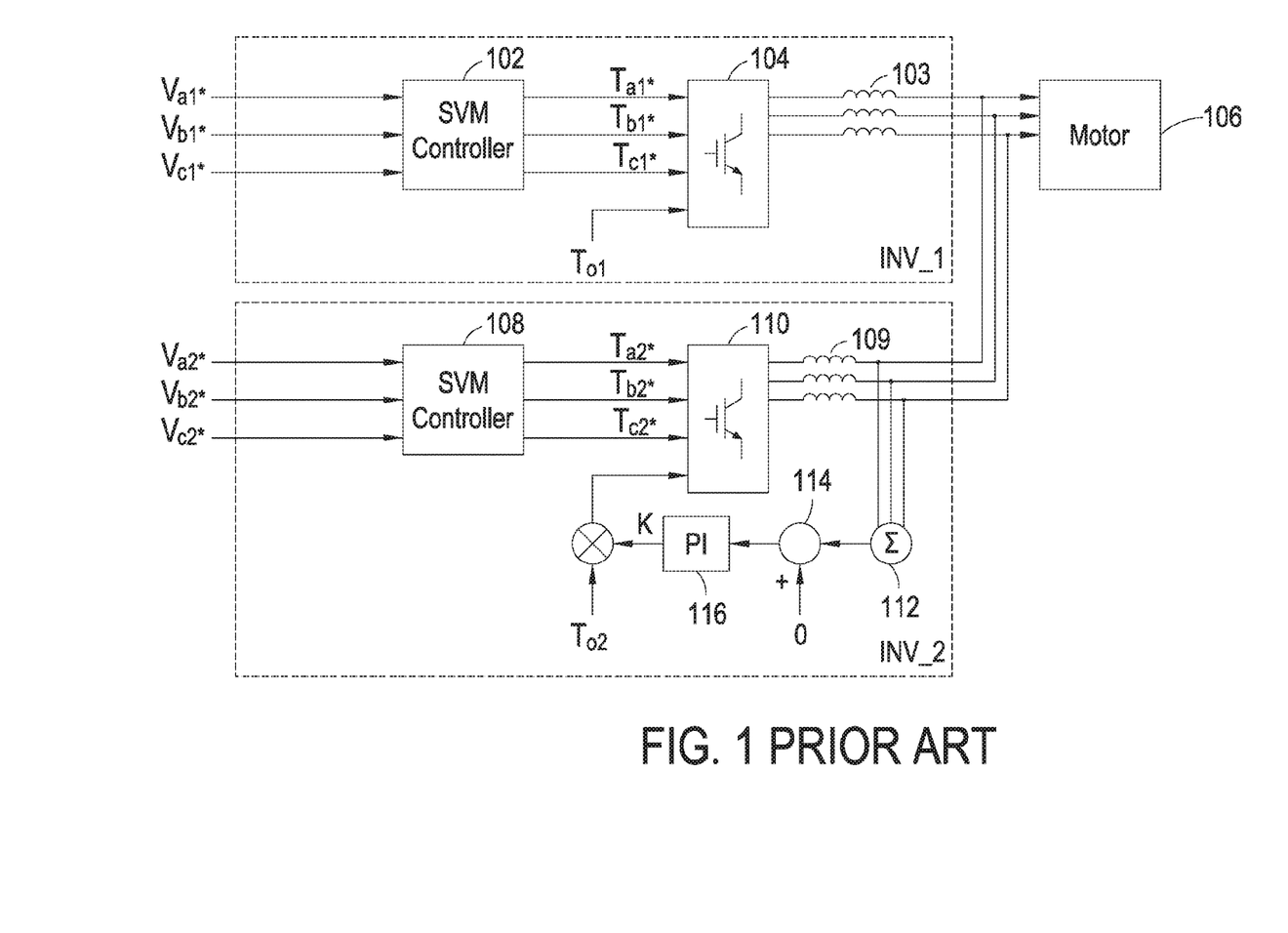
FIG. 1 shows an architecture diagram of the traditional parallel inverter driver system of the first type.

Referring to FIG. 1, which is an architecture diagram of the traditional parallel inverter driver system of the first type. The traditional parallel inverter driver system of the first category of FIG. 1 includes two parallel-connected inverter drivers INV_1 and INV_2, in which the inverter driver INV_1 is a master inverter driver and the inverter driver INV_2 is a slave inverter driver. $V_{a1}^*$, $V_{b1}^*$, $V_{c1}^*$ are the voltage commands inputted into the inverter driver INV_1, and $V_{a2}^*$, $V_{b2}^*$, $V_{c2}^*$ are the voltage commands inputted into the inverter driver INV_2. The master inverter driver INV_1 includes a space-vector modulation (SVM) controller 102, an inductance device 103 and a switch device 104. The space-vector modulation (SVM) controller 102 is configured to convert the voltage commands $V_{a1}^*$, $V_{b1}^*$, $V_{c1}^*$ into duty cycle signals $T_{a1}^*$, $T_{b1}^*$, $T_{c1}^*$. The switch device 104 is driven by the duty cycle signals $T_{a1}^*$, $T_{b1}^*$, $T_{c1}^*$ and a duty cycle signal $T_{01}$ with a zero-voltage vector to conduct switching operations. Thus, an AC output voltage and an AC output current are generated. The inductance device 103 is connected to the outputs of switch device 104 for suppressing the current oscillation of AC output current and then outputting the AC output current to motor 106. Similarly, the slave inverter driver INV_2 includes a space-vector modulation (SVM) controller 108, an inductance device 109 and a switch device 110. The space-vector modulation (SVM) controller 108 is configured to convert the voltage commands $V_{a2}^*$, $V_{b2}^*$, $V_{c2}^*$ into duty cycle signals $T_{a2}^*$, $T_{b2}^*$, $T_{c2}^*$, the switch device 110 is driven by the duty cycle signals $T_{a2}^*$, $T_{b2}^*$, $T_{c2}^*$ and a control signal, which is derived by adding a duty cycle signal $T_{02}$ with a zero-voltage vector with an adjustment quantity K, to conduct switching operations. Thus, an AC output voltage and an AC output current are generated. The inductance device 109 is connected to the outputs of switch device 110 for suppressing the current oscillation of AC output current and then outputting the AC output current to motor 106. In this example, the operation of the slave inverter driver INV_2 is adjusted along with the operation of the master inverter driver INV_1. The adjustment quantity K is generated by the operation of an adder 112, a subtractor 114 and a proportional integrator 116.

Figure 2:
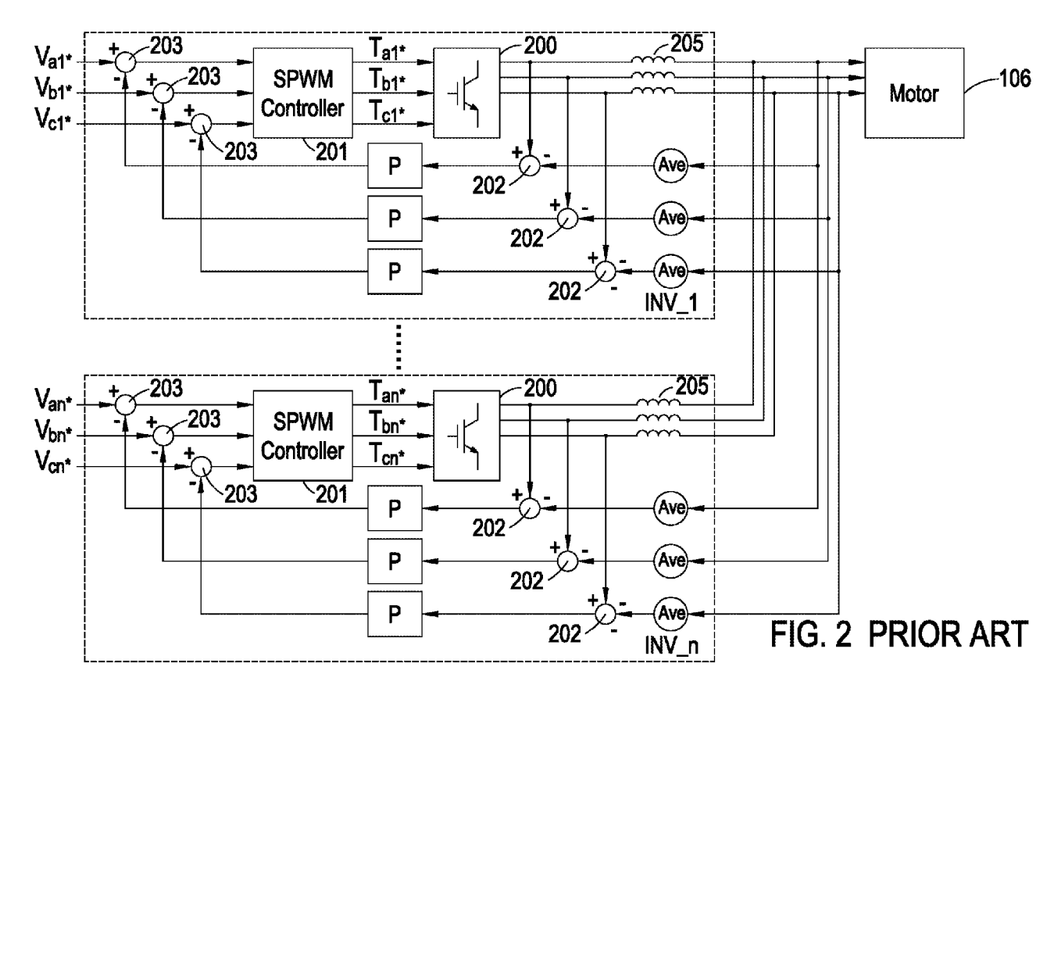
FIG. 2 shows an architecture diagram of the traditional parallel inverter driver system of the second type.

Referring to FIG. 2, which is an architecture diagram of the traditional parallel inverter driver system of the second type. As shown in FIG. 2, the parallel inverter driver system for driving a motor 106 includes parallel-connected inverter drivers INV_1, . . . , INV_n. Each inverter driver is configured to receive a three-phase voltage command ($V_{a1}^*$, $V_{b1}^*$, $V_{c1}^*$), . . . , ($V_{an}^*$, $V_{bn}^*$, $V_{cn}^*$). Each inverter driver includes a switch device 200, a sinusoidal pulse-width modulation (SPWM) controller 201, a plurality of operators 202 and 203, an inductance device 205, a plurality of gain controllers P and a plurality of current averagers Ave. The switch device 200 is connected to the outputs of the sinusoidal pulse-width modulation (SPWM) controller 201. The operator 203 is used to perform arithmetical operations to the three-phase voltage command ($V_{a1}^*$, $V_{b1}^*$, $V_{c1}^*$), . . . , ($V_{an}^*$, $V_{bn}^*$, $V_{cn}^*$) and the compensating voltage command, thereby generating a compensated three-phase voltage command and then outputting the command to the sinusoidal pulse-width modulation (SPWM) controller 201 for converting the compensated three-phase voltage command into duty cycle signals ($T_{a1}^*$, $T_{b1}^*$, $T_{c1}^*$), . . . , ($T_{an}^*$, $T_{bn}^*$, $T_{cn}^*$) to switch the switch device 200. Thus, an AC output voltage and an AC output current are generated. The inductance device 205 in each inverter driver can suppress the current oscillation of AC output current and then outputs the suppressed AC output current to motor 106. The compensating voltage command is generated after the operations of the current averagers Ave, the operators 202, 203 and the gain controllers P.

Figure 3:
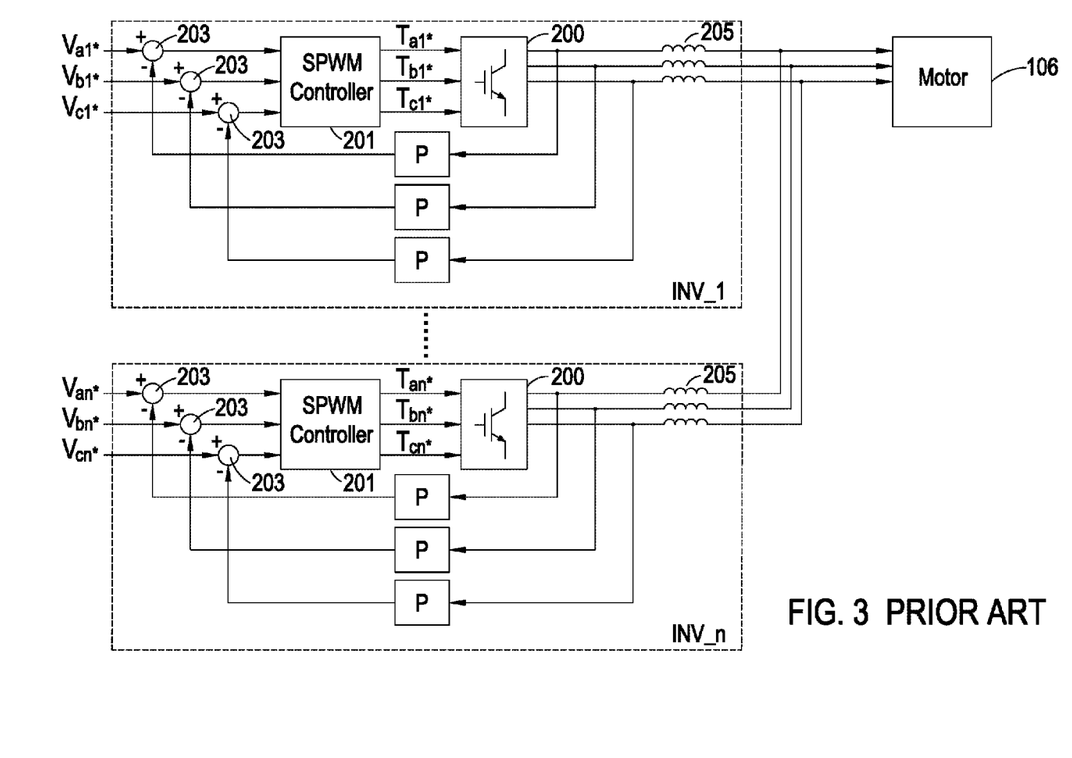
FIG. 3 shows an architecture diagram of the traditional parallel inverter driver system of the third type.

Referring to FIG. 3, which is an architecture diagram of the traditional parallel inverter driver system of the third type. The only difference between the parallel inverter driver system of FIG. 3 and that of FIG. 2 is that the output phase current of each inverter driver is provided to the gain controller P for calculating a compensating voltage command for the output phase current. The compensating voltage command is fed back to the sinusoidal pulse-width modulation (SPWM) controller 201. The operator 203 is used to perform arithmetical operations to the three-phase voltage command ($V_{a1}^*$, $V_{b1}^*$, $V_{c1}^*$), . . . , ($V_{an}^*$, $V_{bn}^*$, $V_{cn}^*$) and the compensating voltage command, thereby generating a compensated three-phase voltage command.

The above-mentioned three types of the inverter drivers of the parallel inverter driver systems can use the inductance devices with different reactance according to the power state, thereby suppressing the current oscillation of AC output current. However, when the inverter drivers are operated in high power state, the inductance devices with higher reactance must be employed correspondingly. Due to the inductance devices with higher reactance have larger volumes and heavier weights, the volumes and the costs of the parallel inverter driver systems will be increased correspondingly. Although, the inductance devices can be replaced by the LCL filter in some prior arts, the structure of this conventional system is complicated. In addition, short life electrolytic capacitors must be used in the LCL filter, resulting in the electrolytic capacitors must be changed frequently and the cost of the LCL filter is increased. Consequently, the problem of having higher cost still exists in the parallel inverter driver system. Moreover, when the above-mentioned three types of the inverter drivers of the parallel inverter driver system are operated, the current of each inverter drivers can't be outputted to the motor completely due to the minor deviation existed between any two individual inverter drivers. Consequently, the circulating current is generated through current mutually flow between respective inverter drivers. Although each of the three types parallel inverter driver systems is capable of suppressing the circulating current, the parallel inverter driver systems still exist the problem of the zero-sequence current with reference to the circulating current suppressing, so the suppressing effect is limited.

Therefore, there is a need of providing a circulating current and oscillating current suppressing method and parallel inverter driver system in order to eliminate the above drawbacks.

SUMMARY OF THE INVENTION

An object of this disclosure is to provide a circulating current and oscillating current suppressing method and parallel inverter driver system, which employs a virtual inductance device to generate a compensated three-phase current according to a suppressing three-phase current generated by a virtual inductance device based on the impedance value of the entity inductance device. The compensated three-phase current meets the ideal impedance value co-generated by the virtual inductance unit and the entity inductance device. As a result, the suppressing effect of the oscillating current of the entity inductance device with the smaller impedance value is equal to the suppressing effect of the oscillating current of the entity inductance device with the larger impedance value. Consequently, the inventive parallel inverter driver system can use the entity inductance device with smaller volume and lower cost so as to reduce the volume and cost of the parallel inverter driver system.

Another object of this disclosure is to provide a circulating current and oscillating current suppressing method and parallel inverter driver system, which employs a circulating current suppressing device for correcting the three-phase voltage command according to a circulating current and/or a zero-sequence current of the parallel inverter driver system. As a result, a circulating current and a zero-sequence current of the parallel inverter driver system can be suppressed effectively and simultaneously.

In order to achieve the above objects, the present disclosure provides a circulating current and oscillating current suppressing method for a plurality of inverter drivers of a parallel inverter driver system, wherein each inverter driver includes an entity inductance device configured to suppress a transition three-phase current outputted from a switch device in the inverter driver. The suppressing method comprises the following steps: (a) collecting a suppressing three-phase current of the output of each inverter driver and a summation current information which generated after summing all the suppressing three-phase currents of the inverter drivers by using a voltage generation unit of a virtual inductance device, and calculating the collected current information by using an impedance to generate a corrected three-phase voltage in each inverter driver correspondingly; (b) comparing the corrected three-phase voltage of each inverter driver with a three-phase voltage command of each inverter driver by using a voltage comparator unit of the virtual inductance device to generate a compensated three-phase voltage; (c) converting the compensated three-phase voltage of each inverter driver to a compensated three-phase current by using a voltage/current calculation unit of the virtual inductance device, wherein the compensated three-phase current is corresponding to a current generated by simulating the transition three-phase current which is co-suppressed by a virtual inductance unit and the entity inductance device; (d) collecting the transition three-phase current of each inverter driver and the compensated three-phase current of each inverter driver, and generating an index in each inverter driver according to the collected results and a desired circulating current quantity and/or a desired zero-sequence current quantity of the parallel inverter driver system; (e) generating a zero-sequence voltage in each inverter driver associated with the circulating current and/or the zero-sequence current of the parallel inverter driver system according to the index, the three-phase voltage command and an operating mode; (f) correcting the three-phase voltage command by the zero-sequence voltage to generate a corrected three-phase voltage command; and (g) generating a duty cycle signal according to the corrected three-phase voltage command for controlling switch operations of the corresponding inverter driver.

In order to achieve the above objects, the present disclosure provides a parallel inverter driver system for driving a motor. The parallel inverter driver system comprises a plurality of inverter drivers connected in parallel with each other. Each inverter driver comprises: a switch device; a pulse-width modulation controller connected to an input of the switch device and configured to control switch operations of the switch device according to a duty cycle signal; an entity inductance device electrically connected between the motor and an output of the switch device and configured to suppress an oscillating current of a transition three-phase current outputted from the switch device, and generate a compensated three-phase current to the motor; a virtual inductance device having an input connected between an output of the entity inductance device and the motor, wherein the virtual inductance device is configured to collect a suppressing three-phase current of self-inverter driver and other inverter drivers, and output a compensated three-phase current correspondingly according to a three-phase voltage command of the self-inverter driver; and a circulating current suppressing device configured to collect the transition three-phase current and the compensated three-phase current of the self-inverter driver, and correct the three-phase voltage command according to the collecting result, wherein the pulse-width modulation controller generates the duty cycle signal to the switch device according to the corrected three-phase voltage command.

BRIEF DESCRIPTION OF THE DRAWINGS

FIGS. 8-1 and 8-2 show a flow diagram of the circulating current and oscillating current suppressing method according to the second preferred embodiment of the present invention.

DETAILED DESCRIPTION OF THE PREFERRED EMBODIMENT

An exemplary embodiment embodying the features and advantages of this embodiment will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as a confinement for this embodiment.

Figure 4:
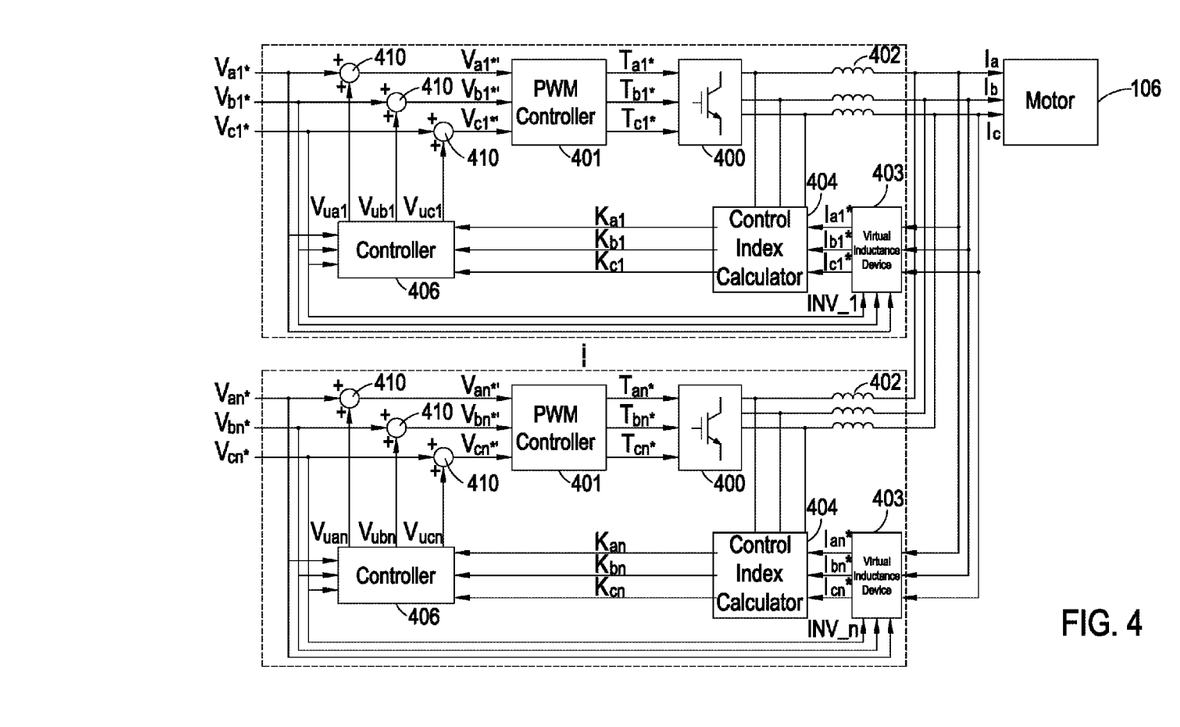
FIG. 4 shows an architecture diagram of the parallel inverter driver system according to the first preferred embodiment of the present invention.
Figure 5:
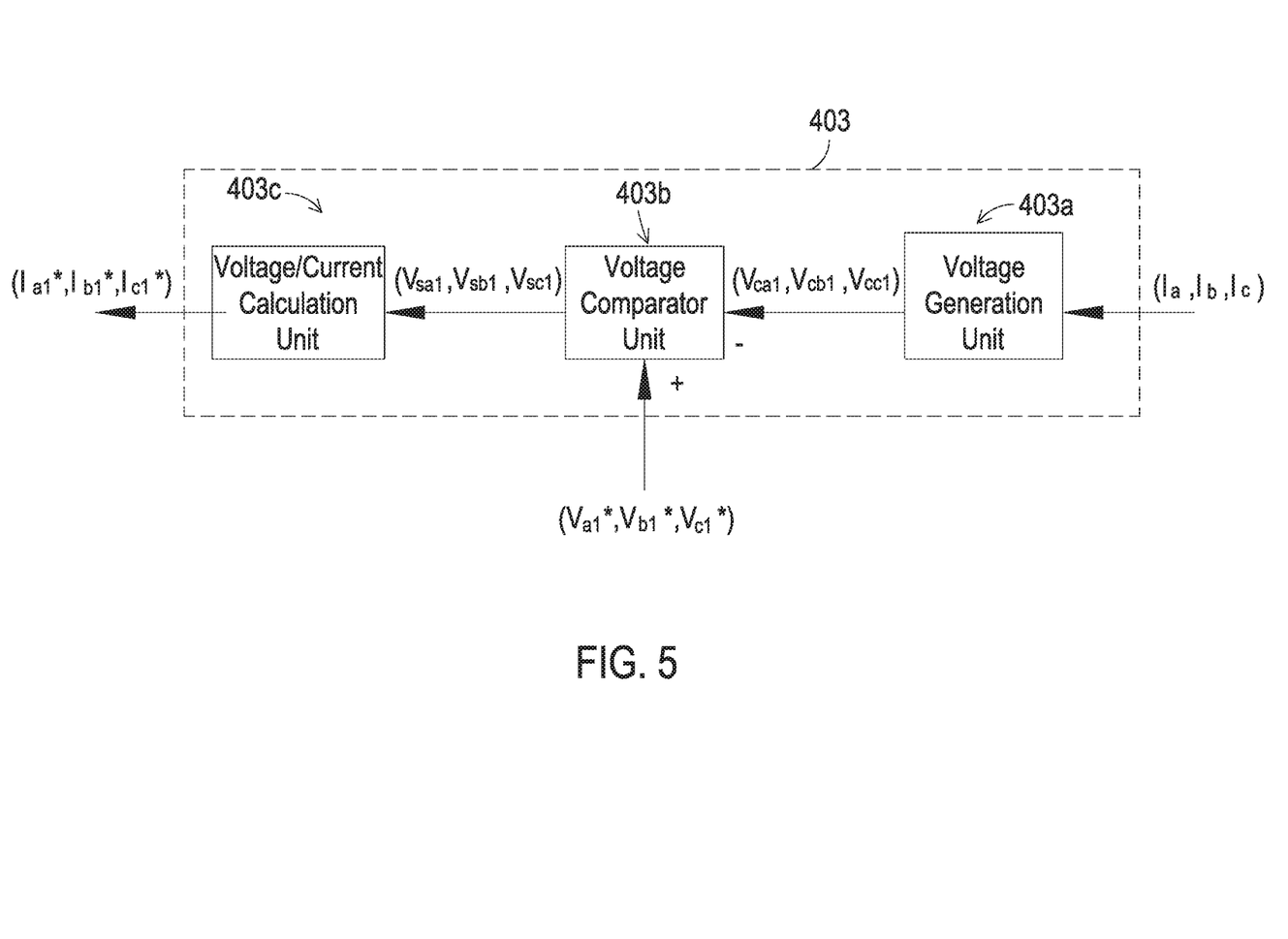
FIG. 5 shows an interior architecture diagram of the virtual inductance device of FIG. 4.

Please refer to FIGS. 4 and 5, wherein FIG. 4 is an architecture diagram of the parallel inverter driver system according to the first preferred embodiment of the present invention, and FIG. 5 is an interior architecture diagram of the virtual inductance device of FIG. 4. It is noted that the same element numbers mean the similar elements. As shown in FIGS. 4 and 5, the parallel inverter driver system comprises a plurality of inverter drivers INV_1, . . . , INV_n connected in parallel with each other and is used to drive a motor 106. Each inverter driver (INV_1, . . . , INV_n) is used to receive a three-phase voltage command ($V_{a1}^*$, $V_{b1}^*$, $V_{c1}^*$), . . . , ($V_{an}^*$, $V_{bn}^*$, $V_{cn}^*$). Each inverter driver INV_1, . . . , INV_n includes a switch device 400, a pulse-width modulation (PWM) controller 401 and an entity inductance device 402, wherein the input of the switch device 400 is connected to the pulse-width modulation (PWM) controller 401, the output of the switch device 400 is connected to the entity inductance device 402. The switch device 400 is configured to conduct switching operations according to a duty cycle signal ($T_{a1}^*$, $T_{b1}^*$, $T_{c1}^*$), . . . , ($T_{an}^*$, $T_{bn}^*$, $T_{cn}^*$) outputted by the pulse-width modulation (PWM) controller 401. Thus, the three-phase voltage command ($V_{a1}^*$, $V_{b1}^*$, $V_{c1}^*$), . . . , ($V_{an}^*$, $V_{bn}^*$, $V_{cn}^*$) is converted into a transition three-phase voltage and a transition three-phase current. The input of the entity inductance device 402 is connected to the output of the switch device 400, and the output of the entity inductance device 402 is connected to the output of the corresponding inverter driver. The entity inductance device 402 is configured to suppress an oscillating current of a transition three-phase current outputted from the switch device 400 for generating a suppressing three-phase current to the motor 106 for driving the motor 106.

Each inverter driver INV_1, . . . , INV_n further includes a virtual inductance device 403. An input of the virtual inductance device 403 is connected between an output of the entity inductance device 402 and the motor 106. The virtual inductance device 403 is configured to receive the suppressing three-phase current of self-inverter driver and other inverter drivers, sum all of the suppressing three-phase currents of the inverter drivers including the self-inverter driver, and calculate a compensated three-phase current ($I_{a1}^*$, $I_{b1}^*$, $I_{c1}^*$), . . . , ($I_{an}^*$, $I_{bn}^*$, $I_{cn}^*$) with ideal impedance value which generated by a virtual inductance unit and the entity inductance device 402 according to respective three-phase voltage command ($V_{a1}^*$, $V_{b1}^*$, $V_{c1}^*$), . . . , ($V_{an}^*$, $V_{bn}^*$, $V_{cn}^*$) of respective inverter driver. The virtual inductance unit is generated by the virtual inductance device 403, and the transition three-phase current outputted by the switch device 400 can be corrected according to the compensation of the compensated three-phase current ($I_{a1}^*$, $I_{b1}^*$, $I_{c1}^*$), . . . , ($I_{an}^*$, $I_{bn}^*$, $I_{cn}^*$) so as to reduce the oscillating current of the compensated three-phase current, as raising the compensation effect of the entity inductance device 402.

The interior architecture of the virtual inductance device 403 of each inverter driver will be illustrated by referring to FIG. 5. In FIG. 5, due to that the interior architectures of the virtual inductance devices 403 of the inverter drivers are the same, the virtual inductance device 403 of the inverter driver INV_1 received three-phase voltage command ($V_{a1}^*$, $V_{b1}^*$, $V_{c1}^*$) in FIG. 4 is used as an exemplary template for illustration. Referring to FIG. 5 again, the virtual inductance device 403 further includes a voltage generation unit 403a, a voltage comparator unit 403b and a voltage/current calculation unit 403c. The voltage generation unit 403a is configured to collect the suppressing three-phase current of the self-inverter driver and the suppressing three-phase current information of other inverter drivers, sum all of the suppressing three-phase currents of the inverter drivers including the self-inverter driver, and generate the corrected three-phase voltage ($V_{ca1}$, $V_{cb1}$, $V_{cc1}$) according to the collected current information (the summation current ($I_a$, $I_b$, $I_c$) received by the motor 106) by using an impedance, wherein the impedance is an impedance of the motor 106 and the impedance is variable and included in the voltage generation unit 403a. The voltage comparator unit 403b is configured to receive the corrected three-phase voltage ($V_{ca1}$, $V_{cb1}$, $V_{cc1}$) and the three-phase voltage command ($V_{a1}^*$, $V_{b1}^*$, $V_{c1}^*$), and compare the corrected three-phase voltage ($V_{ca1}$, $V_{cb1}$, $V_{cc1}$) with the three-phase voltage command ($V_{a1}^*$, $V_{b1}^*$, $V_{c1}^*$) to generate a compensated three-phase voltage ($V_{sa1}$, $V_{sb1}$, $V_{sc1}$). The voltage/current calculation unit 403c is configured to receive the compensated three-phase voltage ($V_{sa1}$, $V_{sb1}$, $V_{sc1}$) and convert the compensated three-phase voltage to the compensated three-phase current ($I_{a1}^*$, $I_{b1}^*$, $i_{c1}^*$), and then the transition three-phase current outputted by the switch device 400 can be corrected according to the compensation of compensated three-phase current ($I_{a1}^*$, $I_{b1}^*$, $I_{c1}^*$) so as to reduce the oscillating current of the compensated three-phase current, as raising the compensation effect of the entity inductance device 402. The compensated three-phase current ($I_{a1}^*$, $I_{b1}^*$, $I_{c1}^*$) reflects the ideal three-phase current flowing through the entity inductance device 402 and the ideal inductance generated by virtual inductance unit. In addition, the corrected three-phase voltage ($V_{ca1}$, $V_{cb1}$, $V_{cc1}$) and the compensated three-phase voltage ($V_{sa1}$, $V_{sb1}$, $V_{sc1}$) in FIG. 5 which correspond to the nth inverter driver can be changed to corrected three-phase voltage ($V_{can}$, $V_{cbn}$, $V_{ccn}$) and the compensated three-phase voltage ($V_{san}$, $V_{sbn}$, $V_{scn}$).

Referring to FIGS. 4 and 5 again, each inverter driver INV_1, . . . , INV_n includes a circulating current suppressing device connected between the output of the switch device 400 and the input of the pulse-width modulation (PWM) controller 401, and the circulating current suppressing device is also connected to the output of the virtual inductance device 403. The circulating current suppressing device of each inverter driver INV_1, . . . , INV_n also includes a control index calculator (CIC) 404 and a controller 406. In accordance with practical demand, the control index calculator 404 can calculate the three-phase index ($K_{a1}$, $K_{b1}$, $K_{c1}$), . . . , ($K_{an}$, $K_{bn}$, $K_{cn}$) according to the transition three-phase current correspondingly outputted from respective inverter driver INV_1, . . . , INV_n and the compensated three-phase current ($I_{a1}^*$, $I_{b1}^*$, $I_{c1}^*$), . . . , ($I_{an}^*$, $I_{bn}^*$, $I_{cn}^*$) outputted from the virtual inductance device 403. The controller 406 is configured for receiving the three-phase index ($K_{a1}$, $K_{b1}$, $K_{c1}$), . . . , ($K_{an}$, $K_{bn}$, $K_{cn}$) and the three-phase voltage command ($V_{a1}^*$, $V_{b1}^*$, $V_{c1}^*$), . . . , ($V_{an}^*$, $V_{bn}^*$, $V_{cn}^*$) and respectively generating a voltage injection quantity (i.e. a zero-sequence voltage) ($V_{ua1}$, $V_{ub1}$, $V_{uc1}$), . . . , ($V_{uan}$, $V_{ubn}$, $V_{ucn}$) associated with the circulating current and/or the zero-sequence current for each phase of the three-phase voltage command, thereby correcting the three-phase voltage command ($V_{a1}^*$, $V_{b1}^*$, $V_{c1}^*$), . . . , ($V_{an}^*$, $V_{bn}^*$, $V_{cn}^*$) by the voltage injection quantity ($V_{ua1}$, $V_{ub1}$, $V_{uc1}$), . . . , ($V_{uan}$, $V_{ubn}$, $V_{ucn}$) in a feed forward configuration instead of a feed backward configuration. In this embodiment, the controller 406 is an unbalanced zero-sequence injection generator (UZSIG). The correction of the three-phase voltage command ($V_{a1}^*$, $V_{b1}^*$, $V_{c1}^*$), . . . , ($V_{an}^*$, $V_{bn}^*$, $V_{cn}^*$) is accomplished by adding the original three-phase voltage command ($V_{a1}^*$, $V_{b1}^*$, $V_{c1}^*$), . . . , ($V_{an}^*$, $V_{bn}^*$, $V_{cn}^*$) with the voltage injection quantity ($V_{ua1}$, $V_{ub1}$, $V_{uc1}$), . . . , ($V_{uan}$, $V_{ubn}$, $V_{ucn}$) via the adder 410, thereby generating a corrected three-phase voltage command ($V_{a1}^{*'}$, $V_{b1}^{*'}$, $V_{c1}^{*'}$), . . . , ($V_{an}^{*'}$, $V_{bn}^{*'}$, $V_{cn}^{*'}$). The corrected three-phase voltage command ($V_{a1}^{*'}$, $V_{b1}^{*'}$, $V_{c1}^{*'}$), . . . , ($V_{an}^{*'}$, $V_{bn}^{*'}$, $V_{cn}^{*'}$) is transmitted to the pulse-width modulation (PWM) controller 401. The pulse-width modulation (PWM) controller 401 is configured to compare the corrected three-phase voltage command ($V_{a1}^{*'}$, $V_{b1}^{*'}$, $V_{c1}^{*'}$), . . . , ($V_{an}^{*'}$, $V_{bn}^{*'}$, $V_{cn}^{*'}$) with a triangular carrier wave, and in response thereto generating a duty cycle signal ($T_{a1}^*$, $T_{b1}^*$, $T_{c1}^*$), . . . , ($T_{an}^*$, $T_{bn}^*$, $T_{cn}^*$) for controlling the switching operations of the switch device 400, thereby using the compensated three-phase current ($I_{an}^*$, $I_{b1}^*$, $I_{c1}^*$), . . . , ($I_{an}^*$, $I_{bn}^*$, $I_{cn}^*$) generated by the virtual inductance device 403 of each inverter driver INV_1, . . . , INV_n to correct the transition three-phase current outputted from the switch device 400, and reducing the oscillating current of the transition three-phase current. Consequently, the suppressing effect can be achieved as raising the compensation effect of the entity inductance device 402. Then, the correct three-phase voltage command ($V_{a1}^*$, $V_{b1}^*$, $V_{c1}^*$), . . . , ($V_{an}^*$, $V_{bn}^*$, $V_{cn}^*$) is generated by the circulating current suppressing device according to a zero-sequence current and/or the circulating current amount of the parallel inverter driver system, thereby suppressing the zero-sequence current and the circulating current of the parallel inverter driver system. The feedback current of each inverter driver INV_1, . . . , INV_n can be measured by the current sensor of the inverter driver. The summation current can be acquired by means of the communications among the inverter drivers INV_1, . . . , INV_n without the need of additional current sensors.

In some embodiments, the voltage/current calculation unit 403c of the virtual inductance device 403 is configured to perform an integral operation of the compensated three-phase voltage ($V_{sa1}$, $V_{sb1}$, $V_{sc1}$), . . . , ($V_{san}$, $V_{sbn}$, $V_{scn}$) and perform a multiplication operation with respect to the result of the integral operation and a reciprocal of an ideal impedance value. Consequently, the compensated three-phase current ($I_{a1}^*$, $I_{b1}^*$, $I_{c1}^*$), . . . , ($I_{an}^*$, $I_{bn}^*$, $I_{cn}^*$) which reflects the ideal three-phase current flowing through the ideal impedance value generated by the entity inductance device 402 and the virtual inductance unit can be calculated. The ideal impedance value can be adjusted according to the rotational speed of the motor 106. For example, when the rotational speed of the motor 106 is increased, because of the summation three-phase current ($I_a$, $I_b$, $I_c$) is correspondingly raised, the effect of suppressing is correspondingly increased. Consequently, the summation three-phase current ($I_a$, $I_b$, $I_c$) is correspondingly raised by reducing the ideal impedance value. Otherwise, when the rotational speed of the motor 106 is reduced, because of the summation three-phase current ($I_a$, $I_b$, $I_c$) is correspondingly reduced, the effect of suppressing is correspondingly reduced. Consequently, the summation three-phase current ($I_a$, $I_b$, $I_c$) is correspondingly reduced by reducing the ideal impedance value.

From the above descriptions and taking the inverter driver INV_1 as an example, the inventive system employs the virtual inductance device 403 to calculate the compensated three-phase current of the ideal impedance value generated by the entity inductance device 402 and the virtual inductance unit and corrects the transition three-phase current outputted from a switch device 400 to generate a corrected transition three-phase current, thereby the virtual inductance unit can co-suppress the oscillating current of the transition three-phase current with the entity inductance device 402 at the output of the switch device 400. In other word, the virtual inductance device 403 generates the compensated three-phase current ($I_{a1}^*$, $I_{b1}^*$, $I_{c1}^*$) which is corresponding to a current generated by simulating the transition three-phase current co-suppressed by a virtual inductance unit and the entity inductance device 402. Then, a formula existing among the impedance of the entity inductance device 402, the impedance of the virtual inductance unit and the three-phase max circulating current which still exists in the corrected transition three-phase current is:

$$(L_{real} + L_{VR}) = (V_{dc} * T_{SW} * \epsilon_D) / \Delta I_{max}$$

wherein $L_{real}$ is the impedance of the entity inductance device 402, $L_{VR}$ is the impedance of the virtual inductance unit, $\Delta I_{max}$ is the three-phase max circulating current which still exists in the corrected transition three-phase current, $T_{SW}$ is the duty cycle signal of the switch operations of the switch device 400, $\epsilon_D$ is the percentage of dislocation of the respective three-phase duty cycle signal ($T_{a1}^*$, $T_{b1}^*$, $T_{c1}^*$), . . . , ($T_{an}^*$, $T_{bn}^*$, $T_{cn}^*$) in each inverter driver INV_1, . . . , INV_n, and $V_{dc}$ is the voltage at an output terminal of the switch device 400, and the $T_{SW}$, $\epsilon_D$ and $V_{dc}$ can be constant in account with the specific device. In this embodiment, the virtual inductance device generates the virtual inductance unit for co-suppressing the current oscillation of the transition three-phase current with an entity inductance device. Therefore, the traditional inverter driver without the virtual inductance device is employed for suppressing the current oscillation of the transition three-phase current only by the impedance value of the entity inductance device which causes the entity inductance device with larger impedance value. Because of configuring the virtual inductance unit to the output of the switch device 400 by the virtual inductance device 403, the virtual inductance unit can co-suppress the current oscillation of the transition three-phase current with an entity inductance device 402. That is, the current oscillation of the transition three-phase current is suppressed by using the ($L_{real}+L_{VR}$). As a result, the entity inductance device 402 can be consist of the entity inductance device with smaller impedance value to make the entity inductance device with smaller volume and lower cost.

Certainly, when the impedance value of the entity inductance device of the inverter driver in this embodiment is equal to the impedance value of the traditional entity inductance device, the suppressing effect of the current oscillation of the transition three-phase current by the entity inductance device can be raised due to the virtual inductance units of the virtual inductance device 403 for co-suppressing the current oscillation of the transition three-phase current with an entity inductance device in this invention.

The control index calculator 404 can calculate the three-phase index ($K_{a1}$, $K_{b1}$, $K_{c1}$), . . . , ($K_{an}$, $K_{bn}$, $K_{cn}$) according to the object to be suppressed, such as the circulating current or/and the zero-sequence current. The correction of the three-phase voltage commands can alter the voltage injection quantity by using a PWM-based operating mode, such as the sinusoidal pulse-width modulation (SPWM) mode, the space-vector pulse-width modulation (SVPWM) mode, or the digital pulse-width modulation (DPWM) mode, in accordance with the requirements on the operating mode. Hence, the controller 406 can generate different commands in response to different operating modes, and the pulse-width modulation (PWM) controller 401 can be replaced with a sinusoidal pulse-width modulation (SPWM) controller, a space-vector pulse-width modulation (SVPWM) controller, or a digital pulse-width modulation (DPWM) controller. The operation of using the pulse-width modulation (PWM) controller 401 to convert the corrected voltage command into practical input can remove the constraints on the function of the micro-controller unit (not shown) of the pulse-width modulation (PWM) controller 401. That is, the micro-controller unit of the pulse-width modulation (PWM) controller 401 doesn't need to support the function of dynamically adjusting the duty cycle signal of the switch device 400.

Figure 6A:
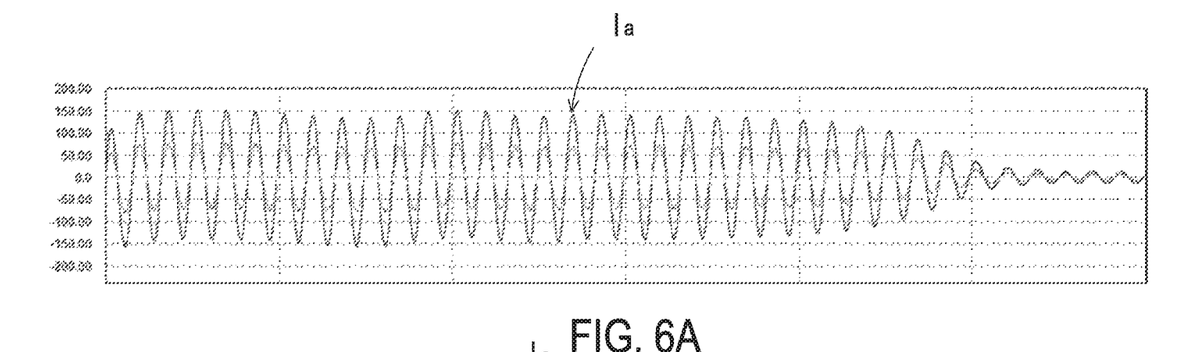
FIG. 6A shows the operation simulation results of the inverter driver system in this invention by using the entity inductance device with an impedance value of 0.2 mH and adding the virtual inductance device.
Figure 6B:
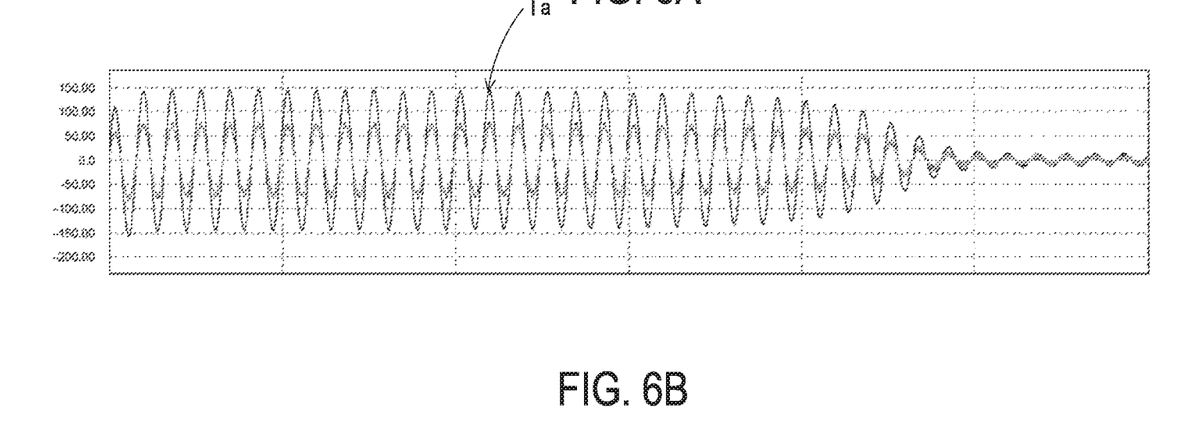
FIG. 6B shows the operation simulation results of the inverter driver system in this invention by using the entity inductance device with an impedance value of 2 mH and without adding the virtual inductance device.
Figure 7A:
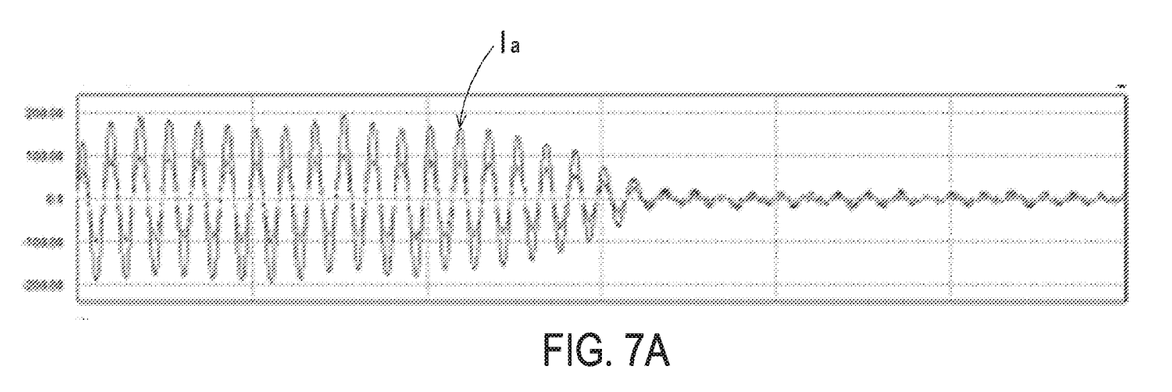
FIG. 7A shows the operation simulation results of the inverter driver system in this invention by using the entity inductance device with an impedance value of 0.2 mH and without adding the virtual inductance device.
Figure 7B:
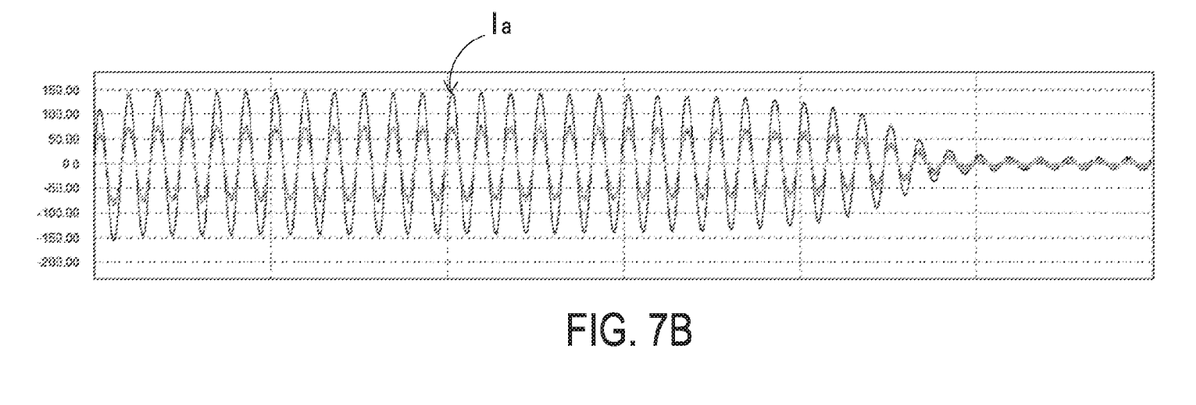
FIG. 7B shows the operation simulation results of the inverter driver system in this invention by using the entity inductance device with an impedance value of 0.2 mH and adding the virtual inductance device.
Figure 81:
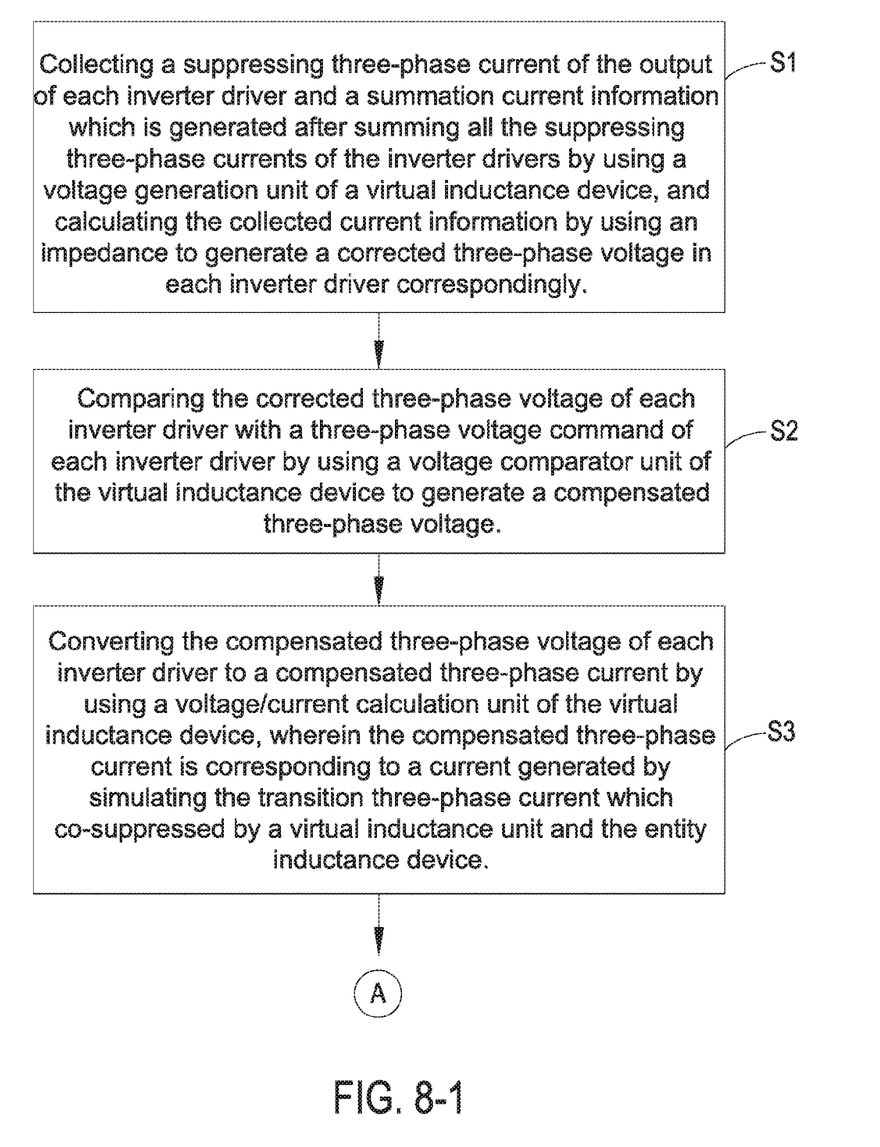
Figure 82:
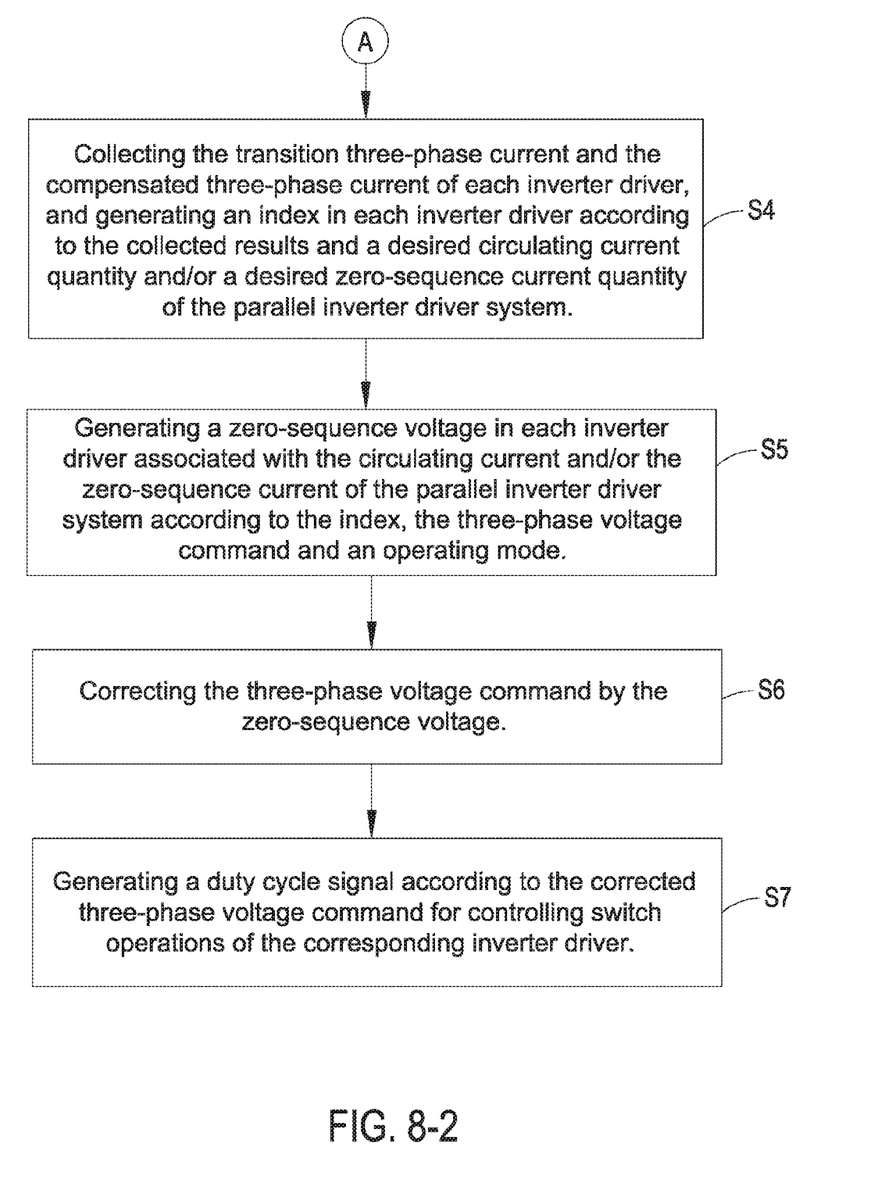

FIGS. 6A to 7B show the effect of the operation of the parallel inverter driver system in this invention after adding the virtual inductance device. For conveniently realizing the technology of this invention, two inverter driver are configured in the parallel inverter driver system in FIGS. 6A to 7B and then using the respective a-phase current of each two inverter driver and the a-phase summation current (Ia) of two inverter driver to illustrate. Please refer to FIGS. 6A, 6B, 7A, and 7B, wherein FIG. 6A shows the operation simulation results of the inverter driver system in this invention by using the entity inductance device with an impedance value of 0.2 mH and adding the virtual inductance device, FIG. 6B shows the operation simulation results of the inverter driver system in this invention by using the entity inductance device with an impedance value of 2 mH and without adding the virtual inductance device, FIG. 7A shows the operation simulation results of the inverter driver system in this invention by using the entity inductance device with an impedance value of 0.2 mH and without adding the virtual inductance device, and FIG. 7B shows the operation simulation results of the inverter driver system in this invention by using the entity inductance device with an impedance value of 0.2 mH and adding the virtual inductance device. As show in FIGS. 6A and 6B, the inverter drivers of the parallel inverter driver system in this invention which make the impedance value of the entity inductance device become smaller by adding the virtual inductance device. For example, the entity inductance device with an impedance value of 0.2 mH can achieve the suppressing effect of the current oscillation as the entity inductance device with larger impedance value such as the entity inductance device with an impedance value of 10 times of 2 mH.

Moreover, as shown in FIGS. 7A and 7B, the condition of using the same impedance value such as the condition of the entity inductance device with an impedance value of 0.2 mH, because of the architecture and control of the inverter driver of the parallel inverter driver system in this invention with the virtual inductance device, the suppressing effect of the current oscillation of the entity inductance device is better than the inverter driver of the traditional parallel inverter driver system without the virtual inductance device.

FIGS. 8-1 and 8-2 show a flow diagram of the circulating current and oscillating current suppressing method according to the second preferred embodiment of the present invention. As shown in FIGS. 8-1 and 8-2, the circulating current and oscillating current suppressing method is implemented with the parallel inverter driver system of FIG. 4 and the virtual inductance device of FIG. 5. The circulating current and oscillating current suppressing method includes the following steps. First, as step S1, collecting the suppressing three-phase current information of the output of each inverter driver including the self-inverter driver and summing all the suppressing three-phase currents of the inverter drivers, then generating the corrected three-phase voltage ($V_{ca1}$, $V_{cb1}$, $V_{cc1}$), . . . , ($V_{can}$, $V_{cbn}$, $V_{ccn}$) according to the collected current information (the summation current ($I_a$, $I_b$, $I_c$) received by the motor 106) by using an impedance to calculate, wherein the impedance is the impedance of the motor 106. Then, as step S2, comparing the corrected three-phase voltage ($V_{ca1}$, $V_{cb1}$, $V_{cc1}$), . . . , ($V_{can}$, $V_{cbn}$, $V_{ccn}$) with the three-phase voltage command ($V_{a1}*$, $V_{b1}*$, $V_{c1}*$), . . . , ($V_{an}*$, $V_{bn}*$, $V_{cn}*$) for each inverter driver to generate a compensated three-phase voltage ($V_{sa1}$, $V_{sb1}$, $V_{sc1}$), . . . , ($V_{san}$, $V_{sbn}$, $V_{scn}$). Thereafter, as step S3, converting the compensated three-phase voltage ($V_{sa1}$, $V_{sb1}$, $V_{sc1}$) ($V_{san}$, $V_{sbn}$, $V_{scn}$) of each inverter driver to the compensated three-phase current ($I_{a1}*$, $I_{b1}*$, $I_{c1}*$), . . . , ($I_{an}*$, $I_{bn}*$, $I_{cn}*$) which reflects the ideal three-phase current flowing through the entity inductance device 402 and the ideal impedance value generated by the virtual inductance unit, and the transition three-phase current outputted by the switch device 400 can be corrected according to the compensation of the compensated three-phase current ($I_{a1}*$, $I_{b1}*$, $I_{c1}*$), . . . , ($I_{an}*$, $I_{bn}*$, $I_{cn}*$). Then, as step S4, in accordance with the practical demand, the control index calculator 404 can calculate the three-phase index ($K_{a1}$, $K_{b1}$, $K_{c1}$), . . . , ($K_{an}$, $K_{bn}$, $K_{cn}$) according to the transition three-phase current correspondingly outputted from each inverter driver INV_1, . . . , INV_n and the compensated three-phase current ($I_{a1}*$, $I_{b1}*$, $I_{c1}*$), . . . , ($I_{an}*$, $I_{bn}*$, $I_{cn}*$) outputted from the virtual inductance device 403. Thereafter, as step S5, the controller 406 of each inverter driver generates voltage injection quantities ($V_{ua1}$, $V_{ub1}$, $V_{uc1}$), . . . , ($V_{uan}$, $V_{ubn}$, $V_{ucn}$) associated with the circulating current and/or the zero-sequence current according to the three-phase index $(K_{a1}, K_{b1}, K_{c1}), \ldots, (K_{an}, K_{bn}, K_{cn})$ in conjunction with the three-phase voltage command $(V_{a1}^*, V_{b1}^*, V_{c1}^*), \ldots, (V_{an}^*, V_{bn}^*, V_{cn}^*)$ and the demand of the operation mode. Then, as step S6, correcting the three-phase voltage command $(V_{a1}^*, V_{b1}^*, V_{c1}^*), \ldots, (V_{an}^*, V_{bn}^*, V_{cn}^*)$ by the feed forward configuration. Finally, as step S7, the pulse-width modulation (PWM) controller 401 compares the corrected three-phase voltage command $(V_{a1}^{*\prime}, V_{b1}^{*\prime}, V_{c1}^{*\prime}), \ldots, (V_{an}^{*\prime}, V_{bn}^{*\prime}, V_{cn}^{*\prime})$ with a triangular carrier wave, and in response thereto generates a duty cycle signal $(T_{a1}^*, T_{b1}^*, T_{c1}^*), \ldots, (T_{an}^*, T_{bn}^*, T_{cn}^*)$ for controlling the switching operations of the switch device 400. Consequently, the transition three-phase current outputted from the switch device 400 is corrected by using the compensated three-phase current $(I_{a1}^*, I_{b1}^*, I_{c1}^*), \ldots, (I_{an}^*, I_{bn}^*, I_{cn}^*)$ generated by the virtual inductance device 403 of each inverter driver INV_1, ..., INV_n, and the oscillating current of the compensated three-phase current is reduced due to the virtual inductance units generated by the virtual inductance device 403. The suppressing effect can be achieved as raising the compensation effect of the entity inductance device 402. Then, the correct three-phase voltage command $(V_{a1}^*, V_{b1}^*, V_{c1}^*), \ldots, (V_{an}^*, V_{bn}^*, V_{cn}^*)$ is generated by the circulating current suppressing device 25 according to a zero-sequence current and/or the circulating current amount of the parallel inverter driver system, thereby suppressing the circulating current of the parallel inverter driver system.

In conclusion, the present disclosure provides a circulating current and oscillating current suppressing method and a parallel inverter driver system, which employs a virtual inductance device for receiving a suppressing three-phase current generated by the entity inductance device of each inverter driver. A compensated three-phase current is generated according to the impedance of the motor and the ideal impedance value, which is co-generated by the virtual inductance unit and the entity inductance device, for correcting the transition three-phase current outputted from a switch device. Consequently, the output of the switch device generates the impedance value of the virtual inductance units and co-suppresses the oscillating current of the transition three-phase current with the entity inductance device so as to enhance the effect of suppressing oscillating current, which is similar with the effect of raising the entity inductance device. As a result, the entity inductance device with the smaller impedance value can be employed in each inverter driver of the inventive parallel inverter driver system so that the volume and cost of the parallel inverter driver system can be reduced. In addition, the circulating current and oscillating current suppressing method and the parallel inverter driver system of present disclosure employs a circulating current suppressing to generate the corrected three-phase voltage command according to the circulating current quantity and/or a zero-sequence current quantity of the parallel inverter driver system. Consequently, the circulating current and the zero-sequence of the parallel inverter driver system can be suppressed effectively.

While the invention has been described in terms of what are presently considered to be the most practical and preferred embodiments, it is to be understood that the invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the invention which is defined by the appended claims.

What is claimed is:

1. A circulating current and oscillating current suppressing method for a plurality of inverter drivers of a parallel inverter driver system, wherein each inverter driver comprises an entity inductance device configured to suppress a transition three-phase current outputted from a switch device in the inverter driver, the method comprising the following steps:

(a) collecting a suppressing three-phase current of the output of each inverter driver and a summation current information which generated after summing all the suppressing three-phase currents of the inverter drivers by using a voltage generation unit of a virtual inductance device, and calculating the collected current information by using an impedance to generate a corrected three-phase voltage in each inverter driver correspondingly;

(b) comparing the corrected three-phase voltage of each inverter driver with a three-phase voltage command of each inverter driver by using a voltage comparator unit of the virtual inductance device to generate a compensated three-phase voltage;

(c) converting the compensated three-phase voltage of each inverter driver to a compensated three-phase current by using a voltage/current calculation unit of the virtual inductance device, wherein the compensated three-phase current is corresponding to a current generated by simulating the transition three-phase current which is co-suppressed by a virtual inductance unit and the entity inductance device;

(d) collecting the transition three-phase current of each inverter driver and the compensated three-phase current of each inverter driver, and generating an index in each inverter driver according to the collected results and a desired circulating current quantity and/or a desired zero-sequence current quantity of the parallel inverter driver system;

(e) generating a zero-sequence voltage in each inverter driver associated with the circulating current and/or the zero-sequence current of the parallel inverter driver system according to the index, the three-phase voltage command and an operating mode;

(f) correcting the three-phase voltage command by the zero-sequence voltage; and (g) generating a duty cycle signal according to the corrected three-phase voltage command for controlling switch operations of the corresponding inverter driver.

2. The suppressing method according to claim 1, wherein the parallel inverter driver system is configured for driving a motor, and the impedance is an impedance of the motor.

3. The suppressing method according to claim 1, wherein the impedance is variable and included in the voltage generation unit.

4. The suppressing method according to claim 1, wherein a formula existing among the impedance of the entity inductance device, the impedance of the virtual inductance unit and a three-phase max circulating current which still exists in the corrected transition three-phase current is:

$$(L_{real}+L_{VR})=(V_{dc}*T_{SW}*\epsilon_D)/\Delta I_{max}$$

wherein $L_{real}$ is the impedance of the entity inductance device, $L_{VR}$ is the impedance of the virtual inductance unit, $\Delta I_{max}$ is the three-phase max circulating current which still exists in the corrected transition three-phase current, $T_{SW}$ is the duty cycle signal of the switch operations of the switch device, $\epsilon_D$ is the percentage of dislocation of the duty cycle signal in each inverter driver, and $V_{dc}$ is a voltage at an output terminal of the switch device.

5. The suppressing method according to claim 4, wherein in the step (c) an integral operation of the compensated three-phase voltage is performed, and a multiplication operation with respect to the result of the integral operation and a reciprocal of an ideal impedance value generated by the entity inductance device and the virtual inductance unit is performed to calculate the compensated three-phase current which reflects the ideal three-phase current flowing through the ideal impedance value.

6. The suppressing method according to claim 5, wherein the ideal impedance value is reduced when a rotational speed of a motor is increased, and the ideal impedance value is increased when the rotational speed of the motor is reduced.

7. A parallel inverter driver system for driving a motor, the parallel inverter driver system comprising:
a plurality of inverter drivers connected in parallel with each other, wherein each inverter driver comprises:
a switch device;
a pulse-width modulation controller connected to an input of the switch device and configured to control switch operations of the switch device according to a duty cycle signal;
an entity inductance device electrically connected between the motor and an output of the switch device and configured to suppress an oscillating current of a transition three-phase current outputted from the switch device, and generate a suppressing three-phase current to the motor;
a virtual inductance device having an input connected between an output of the entity inductance device and the motor, wherein the virtual inductance device is configured to collect a suppressing three-phase current of self-inverter driver and other inverter drivers, and output a compensated three-phase current correspondingly according to a three-phase voltage command of the self-inverter driver; and
a circulating current suppressing device configured to collect the transition three-phase current and the compensated three-phase current of the self-inverter driver, and correct the three-phase voltage command according to the collecting result, wherein the pulse-width modulation controller generates the duty cycle signal to the switch device according to the corrected three-phase voltage command.

8. The parallel inverter driver system according to claim 7, wherein the virtual inductance unit comprises:
a voltage generation unit configured to collect the suppressing three-phase current of the output of the self-inverter driver and other inverter drivers and a summation current information generated after summing all the suppressing three-phase currents of the inverter drivers, and generate the corrected three-phase voltage according to the collected current information by using an impedance;
a voltage comparator unit configured to receive the corrected three-phase voltage and compare the corrected three-phase voltage with the three-phase voltage command received by the self-inverter driver to generate a compensated three-phase voltage; and
a voltage/current calculation unit configured to receive the compensated three-phase voltage and convert the compensated three-phase voltage to the compensated three-phase current.

9. The parallel inverter driver system according to claim 8, wherein the impedance of the voltage generation unit is an impedance of the motor.

10. The parallel inverter driver system according to claim 8, wherein the compensated three-phase current is corresponding to a current generated by simulating the transition three-phase current co-suppressed by a virtual inductance unit and the entity inductance device, and the integral calculation of the compensated three-phase voltage is performed by the voltage/current calculation unit, and a multiplication operation of the result of the integral operation and the reciprocal of an ideal impedance value generated by the entity inductance device and the virtual inductance unit is performed to calculate the compensated three-phase current which reflects an ideal three-phase current flowing through the ideal impedance value.

* * * * *